United States Patent
Conrardy

(10) Patent No.: US 10,259,637 B2
(45) Date of Patent: Apr. 16, 2019

(54) MULTI-FUNCTIONAL, TWO-POUCH PACKAGE WITH DROP TEST SURVIVABILITY

(71) Applicant: Diversey, Inc., Charlotte, NC (US)

(72) Inventor: John Conrardy, Burlington, WI (US)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 15/755,852

(22) PCT Filed: Aug. 31, 2016

(86) PCT No.: PCT/US2016/049705
§ 371 (c)(1),
(2) Date: Feb. 27, 2018

(87) PCT Pub. No.: WO2017/040668
PCT Pub. Date: Mar. 9, 2017

(65) Prior Publication Data
US 2018/0327169 A1    Nov. 15, 2018

Related U.S. Application Data

(60) Provisional application No. 62/212,092, filed on Aug. 31, 2015.

(51) Int. Cl.
*B65D 81/32* (2006.01)
*C09D 175/00* (2006.01)
(Continued)

(52) U.S. Cl.
CPC ..... *B65D 81/3266* (2013.01); *B65D 75/5883* (2013.01); *B65D 81/3261* (2013.01);
(Continued)

(58) Field of Classification Search
CPC ............ B65D 81/3266; B65D 81/3272; B65D 75/5883; B65D 2575/586; C09D 175/02; C09D 175/04
See application file for complete search history.

(56) References Cited

U.S. PATENT DOCUMENTS 2,899,318 A * 8/1959 Long ........................ A23G 3/52
206/219
3,255,872 A * 6/1966 Shaw ....................... F24V 30/00
206/219

(Continued)

FOREIGN PATENT DOCUMENTS

WO    WO 2017/040668    *  3/2017  ......... B65D 75/5883

OTHER PUBLICATIONS

International Search Report and Written Opinion, PCT/US2016/049705, dated Nov. 23, 2016.

*Primary Examiner* — David P Angwin
*Assistant Examiner* — Bob Zadeh
(74) *Attorney, Agent, or Firm* — Michael Best & Friedrich LLP

(57) ABSTRACT

A multi-functional package has a first reactive liquid component in a primary pouch and a second reactive liquid component in a secondary burstable pouch which is inside the primary pouch. The primary pouch has first and second compartments defined by an interior seal. The secondary pouch is in the second compartment. The interior seal extends only a portion of the way across the primary pouch, leaving a liquid flow passageway so that upon bursting the secondary pouch, the first and second liquid components can be mixed with one another. The internal seal is sized and located so that the multi-functional package is resistant to bursting when subjected to drop testing.

18 Claims, 7 Drawing Sheets

(51) Int. Cl.
 *B65D 75/58* (2006.01)
 *C09D 175/02* (2006.01)
 *C09D 175/04* (2006.01)

(52) U.S. Cl.
 CPC ....... *B65D 81/3272* (2013.01); *C09D 175/00* (2013.01); *C09D 175/02* (2013.01); *C09D 175/04* (2013.01); *B65D 2575/586* (2013.01)

(56) References Cited

U.S. PATENT DOCUMENTS

| | | | | |
|---|---|---|---|---|
| 3,887,346 | A * | 6/1975 | Erdman | B65B 29/10 62/4 |
| 4,540,089 | A * | 9/1985 | Maloney | B65D 31/12 206/219 |
| 4,805,767 | A * | 2/1989 | Newman | B65D 81/3266 206/219 |
| 5,603,729 | A * | 2/1997 | Brown | A61F 7/03 607/114 |
| 8,006,844 | B2 * | 8/2011 | McKinley | B29C 44/183 206/219 |
| 9,004,761 | B2 * | 4/2015 | Balteau | A61J 1/2093 206/219 |
| 10,011,399 | B1 * | 7/2018 | Adell | B05C 17/00563 |
| 2011/0100844 | A1 * | 5/2011 | Cimaglio | B65D 81/3266 206/219 |
| 2011/0132782 | A1 * | 6/2011 | Ilfrey | B65D 81/3266 206/222 |
| 2015/0203275 | A1 * | 7/2015 | May | B05C 17/00553 206/219 |

\* cited by examiner

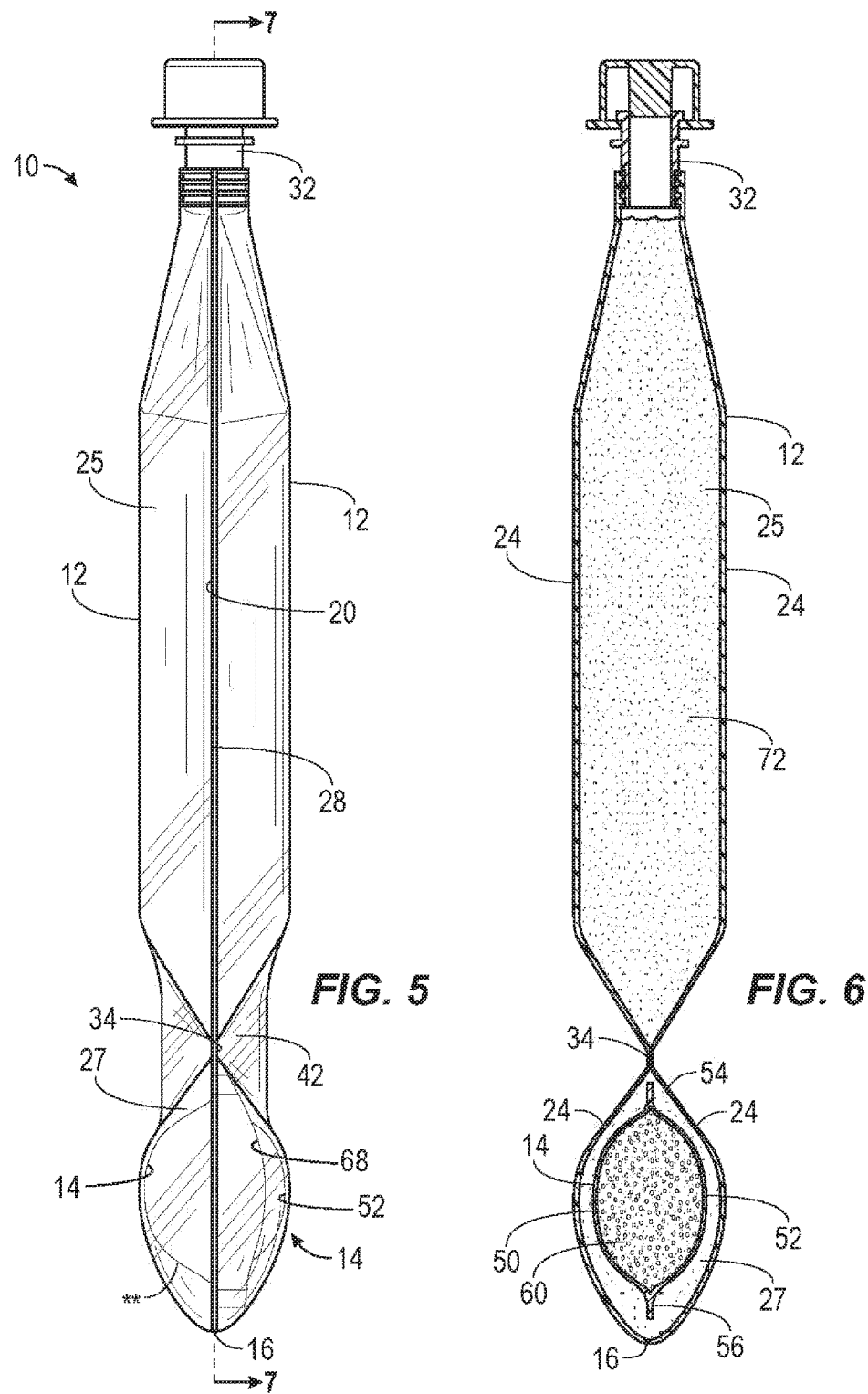

MULTI-FUNCTIONAL, TWO-POUCH PACKAGE WITH DROP TEST SURVIVABILITY

BACKGROUND

A wide variety of liquid compositions involve more two reactive liquid components that must be manufactured, shipped, and stored separately, then combined shortly before use. Some of these components are used to make coatings, such as are used on floors and other substrates.

Once the two reactive components are mixed, they begin to react. As the reaction proceeds, the mixture eventually becomes too viscous to use. The length of time between (i) initial contact and mixing and (ii) viscosity too high to use, is generally referred to as the "pot life" of the mixture.

Various reactants have various storage requirements in order that the reactant has the desired shelf life. Keeping the reactant inside a package and out of contact with reactive components lengthens the shelf life of the component. Reactive components can include air, moisture, other reactants in the system, etc.

Recently a new two-component, alcohol-resistant, chemically-strippable floor coating system has been introduced into the marketplace. This new floor coating system has a first reactive component which is an aqueous polymer dispersion of at least one polyol and at least one wax material, and a second reactive component which includes a polyisocyanate material and at least one organic solvent. The first and second reactive components are designed to react with one another to form an alcohol-resistant, chemically-strippable crosslinked polyurethane coating suitable for use on floors.

The aqueous polymer dispersion of the polyol is provided in a flexible plastic pouch having a removable cap. The polyisocyanate material, which can be rendered inoperative by exposure to even small quantities of water, is provided in a metal can having a removable cap. In order to bring the two components into contact with one another and mix them to uniformity, both the pouch and the can are opened, and the contents of the can are added to the pouch. The need to open the containers and combine the reactive liquid components carries with it the possibility of skin contact with one or more reactants, failure to obtain the desired concentration of the polyisocyanate material in the pouch due to incomplete transfer, spillage, etc.

It would be desirable to avoid the potential hazards and uncertainties of opening separate containers of reactive components in order to transfer the contents one container into the other.

SUMMARY

Efforts to use flexible-film packaging to produce a multi-compartment, multi-functional package for the storage, shipment, mixing, and dispensing of two reactive liquid components are subject to a variety of challenges. One means for keeping the reactive components apart from one another is with a pouch-within-a-pouch package system. In such systems in which one pouch is inside the other pouch, and mixing is to be done inside the outer pouch without exposing the user to contact with either component, the inner pouch is to be opened (e.g., burst, ruptured, etc.) without the opening of the outer pouch. Bursting the inner pouch while it remains inside the outer pouch is made easier by confining the inner pouch to a designated area inside the outer pouch, so that the inner pouch can be readily subjected to the force required to cause it to open.

If a manual opening is to be carried out, it is advantageous to design the package for ease of opening the inner pouch. It is desirable to be able to open the inner pouch without the aid of equipment other than perhaps a rigid surface for supporting the package so that manual pressure can be applied to the inner pouch to cause it to open. Easing the opening of the inner pouch is enhanced by confining the inner pouch to a designated domain inside the outer pouch. This can be accomplished by providing the outer pouch with two compartments. However, the two compartments must be connected by a liquid flow passageway so that, after the inner pouch is opened, the reactive components can be mixed to uniformity throughout the volume within the outer pouch.

One way to provide the outer pouch with two compartments is by providing the outer pouch with an internal seal which divides the outer pouch into two compartments, while stopping the seal short of going all the way across a region of the outer pouch in order to leave a liquid flow passageway between the two compartments. Thereafter, upon the opening of the inner pouch, the reactive component inside the inner pouch can be mixed to substantial uniformity with the reactive component inside the outer pouch. The intermixing occurs throughout the entire volume inside the outer pouch.

Surprisingly, it has been discovered that the size and location of the internal seal have a significant effect upon whether the outer pouch survives drop testing. It has been discovered that the package exhibits enhanced drop test survivability if the seal is made so that it leaves the liquid flow passageway at or close to the perimeter of the outer pouch, rather than in or near the middle of the outer pouch.

A first aspect is directed to a two-component reactive floor coating composition in a multi-functional package. The multi-functional package provides (i) complete and separated containment of a first reactive liquid component and a second reactive liquid component during storage and shipment, (ii) complete and unseparated containment of the first and second reactive liquid components during contact and intermixture with one another, and (iii) controlled containment and controlled dispensing of the reactive liquid components after their contact and intermixture with one another. The two-component reactive floor coating composition in the multi-functional package comprises: (A) a first reactive liquid component sealed inside a closed primary pouch comprising a primary pouch film, with the first reactive liquid component being in direct contact with an inside surface of the primary pouch; (B) a second reactive liquid component inside a closed secondary pouch comprising a secondary pouch film, the second pouch being is a burstable pouch, the secondary pouch being sealed inside the primary pouch, the secondary pouch comprising the second reactive liquid component in direct contact with an inside surface of the secondary pouch, with an outside surface of the secondary pouch being in direct contact with the first reactive liquid component; and (C) a fitment attached to the primary pouch for the controlled dispensing of the first reactive liquid component and the second reactive liquid component after they have been combined and intermixed inside the primary pouch. The primary pouch has at least one external seal of a peripheral section of the primary pouch film to itself along a perimeter edge portion of the primary pouch, and at least one internal seal of the primary pouch film to itself at an interior portion of the primary pouch. The internal seal divides the primary pouch into a first compartment and a second compartment. The first and second compartments are connected to one another with a liquid flow passageway. The second compartment is sized for confinement of the secondary pouch during storage, transport, and application of pressure to burst the secondary pouch. The internal seal extends from a first location on the peripheral edge portion of the primary pouch toward a second location on the peripheral edge portion of the primary pouch. The internal seal extends across from 55 to 85 percent of an internal distance between the first location and the second location. The internal seal terminates with an internal end before reaching the second location, leaving the liquid flow passageway being between the internal end of the internal seal and the second location. The width of the liquid flow passageway is: (a) up to 75 percent of the length of the secondary pouch, and (b) 15 to 45 percent of the distance between the first location and the second location. The liquid flow passageway has a centerpoint in a position within 7.5% to 22.5% of the second location, based on the distance between the first location and the second location.

In an embodiment, the first reactive liquid component comprises an aqueous emulsion comprising at least one member selected from the group consisting of a crosslinkable polyurethane and a crosslinkable polyurea, and the second reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide.

In an embodiment, the first reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide and the second reactive liquid component comprises an aqueous emulsion of at least one member selected from the group consisting of crosslinkable polyurethane and crosslinkable polyurea.

In an embodiment, the first reactive liquid component comprises an aqueous dispersion of at least one member selected from the group consisting of polyol, polyamine, and polyhydrazide, and the second reactive liquid component comprises a polyisocyanate and an organic solvent, such that when combined the first and second components have no more than 1 wt % organic solvent having a vapor pressure of greater than 0.1 mm Hg at 20° C.

In an embodiment, the first reactive liquid component comprises a polyisocyanate material and an organic solvent, and the second reactive liquid component comprises an aqueous dispersion of at least one member selected from the group consisting of polyol, polyamine, and polyhydrazide, such that when combined the first and second components have no more than 1 wt % organic solvent having a vapor pressure of greater than 0.1 mm Hg at 20° C.

In an embodiment, the secondary pouch further comprises a burst membrane which is different from the secondary pouch film, wherein the rupture stress of the burst membrane is less than the rupture stress of the secondary pouch film. The secondary pouch film and the burst membrane may both be substantially impermeable to water vapor.

In an embodiment, the secondary pouch comprises a frangible seal having a failure stress less than the rupture stress of the secondary pouch film. In an embodiment, the secondary pouch film and the burst membrane may both be substantially impermeable to water vapor.

In an embodiment, the first reactive liquid component is present in an amount of from 1 to 5 liters and the second reactive liquid component is present in an amount of from 0.07 to 0.35 liter. The primary pouch film comprises ethylene/α-olefin copolymer and polyamide and has a thickness of from 6 to 20 mils, and the secondary pouch film comprises ethylene/α-olefin copolymer and polyester and has a thickness of from 2 to 5 mils. The internal seal extends across from 70 to 85 percent of the internal distance between the first location and the second location, and the width of the liquid flow passageway is from 15 to 30% of the distance between the first and second locations. The centerpoint of the liquid flow passageway is in a position from 7.5% to 22.5% of the second location, based on the distance between the first location and the second location. Optionally, the package comprises from 50 to 500 cubic centimeters of air.

In an embodiment, the first reactive liquid component is present in an amount of from 1.2 to 4 liters and the second reactive liquid component is present in an amount of from 0.084 to 0.28 liter. The primary pouch film comprises ethylene/α-olefin copolymer and polyamide and has a thickness of from 7 to 15 mils, and the secondary pouch film comprises ethylene/α-olefin copolymer and polyester and has a thickness of from 3 to 4 mils. The internal seal extends across from 75 to 83 percent of the internal distance between the first location and the second location. The width of the liquid flow passageway is from 17 to 25% of the distance between the first and second locations. The centerpoint of the liquid flow passageway is in a position from 8.5% to 16.5% of the second location, based on the distance between the first location and the second location. Optionally, the package comprises from 60 to 400 cubic centimeters of air.

In an embodiment, the first reactive liquid component is present in an amount of from 1.2 to 2 liters and the second reactive liquid component is present in an amount of from 0.084 to 0.140 liter. The primary pouch film comprises ethylene/α-olefin copolymer and polyamide and has a thickness of from 8 to 10 mils, and the secondary pouch film comprises ethylene/α-olefin copolymer and polyester and has a thickness of from 3.3 to 3.7 mils. The internal seal extends across from 78 to 82 percent of the internal distance between the first location and the second location. The width of the liquid flow passageway is from 18 to 22% of the distance between the first and second locations. The centerpoint of the liquid flow passageway is in a position from 9% to 13% of the second location, based on the distance between the first location and the second location. Optionally, the package comprises from 70 to 300 cubic centimeters of air.

In an embodiment, the first reactive liquid component comprises an aqueous emulsion of a crosslinkable polyurethane, the second reactive liquid component comprises a carbodiimide crosslinker, and the secondary pouch further comprises a burst membrane which is different from the secondary pouch film, and the rupture stress of the burst membrane is less than the rupture stress of the secondary pouch film. The first reactive liquid component may be present in an amount of from 1.2 to 2 liters and the second reactive liquid component may be present in an amount of from 0.084 to 0.140 liter. The primary pouch film may comprise ethylene/α-olefin copolymer and polyamide and has a thickness of from 8 to 10 mils, and the secondary pouch film may comprise ethylene/α-olefin copolymer and polyester and may have a thickness of from 3.3 to 3.7 mils. The internal seal may extend across from 78 to 82 percent of the internal distance between the first location and the second location, and the width of the liquid flow passageway may be from 18 to 22% of the distance between the first and second locations. The centerpoint of the liquid flow passageway may be in a position from 9% to 13% of the second location, based on the distance between the first location and the second location. The package may comprise from 70 to 300 cubic centimeters of air. The dispensing fitment may comprise a valve.

In an embodiment, the first reactive liquid component comprises an aqueous emulsion of at least one polyol material and optionally at least one wax, and the second reactive liquid component comprises a polyisocyanate material and at least one organic solvent, and when combined the first and second reactive liquid components have no more than 1 wt % organic solvent having a vapor pressure of greater than 0.1 mm Hg at 20° C. The secondary pouch comprises a frangible seal having a failure stress less than the rupture stress of the secondary pouch film and the secondary pouch film is substantially impermeable to water vapor. The first reactive liquid component may be present in an amount of from 1.2 to 2 liters and the second reactive liquid component may be present in an amount of from 0.084 to 0.140 liter. The primary pouch film may comprise ethylene/α-olefin copolymer and polyamide and may have a thickness of from 8 to 10 mils. The secondary pouch film may comprise ethylene/α-olefin copolymer, polyester, and a vapor barrier layer, and the secondary pouch may have a thickness of from 3.3 to 3.7 mils. The internal seal may extend across from 78 to 82 percent of the internal distance between the first location and the second location, and the liquid flow passageway width may be from 18 to 22% of the distance between the first and second locations. The centerpoint of the liquid flow passageway may be in a position from 9% to 13% of the second location, based on the distance between the first location and the second location. The package may comprise from 70 to 300 cubic centimeters of air. The dispensing fitment may further comprise a valve.

BRIEF DESCRIPTION OF THE DRAWINGS

FIG. 3 is a perspective view of a secondary pouch which is inside the package illustrated in FIGS. 1 and 2.

FIG. 5 is a side view of the package illustrated in FIG. 2, taken from the right side of the package illustrated in FIG. 2, as noted by the 5-5 view in FIG. 2.

FIG. 6 is a longitudinal cross-sectional view of the package illustrated in FIG. 1, taken through section 6-6 of FIG. 1.

DETAILED DESCRIPTION

Figure 1:
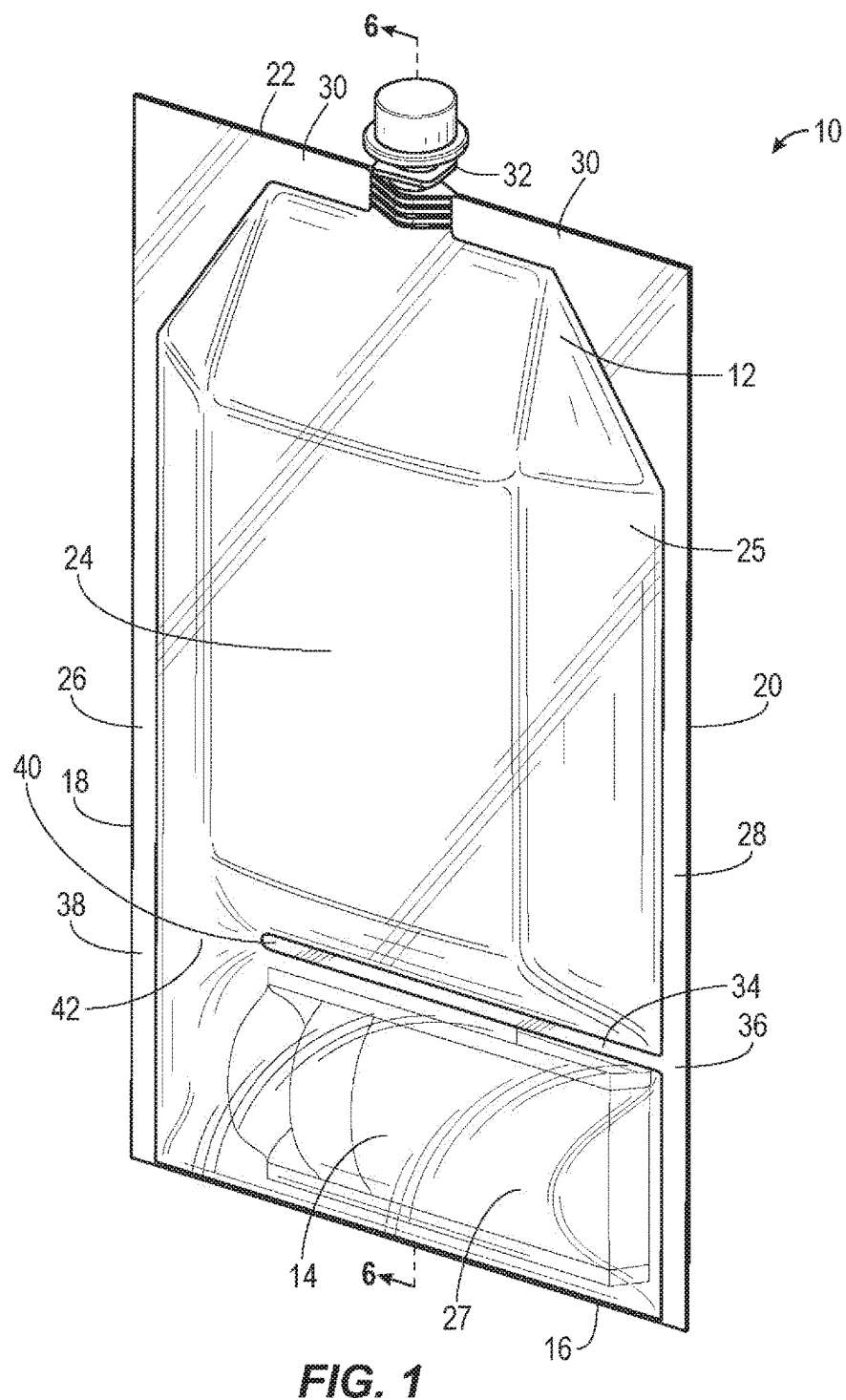
FIG. 1 is a perspective view of an embodiment of a multi-functional, two-pouch package containing two reactive components.
Figure 2:
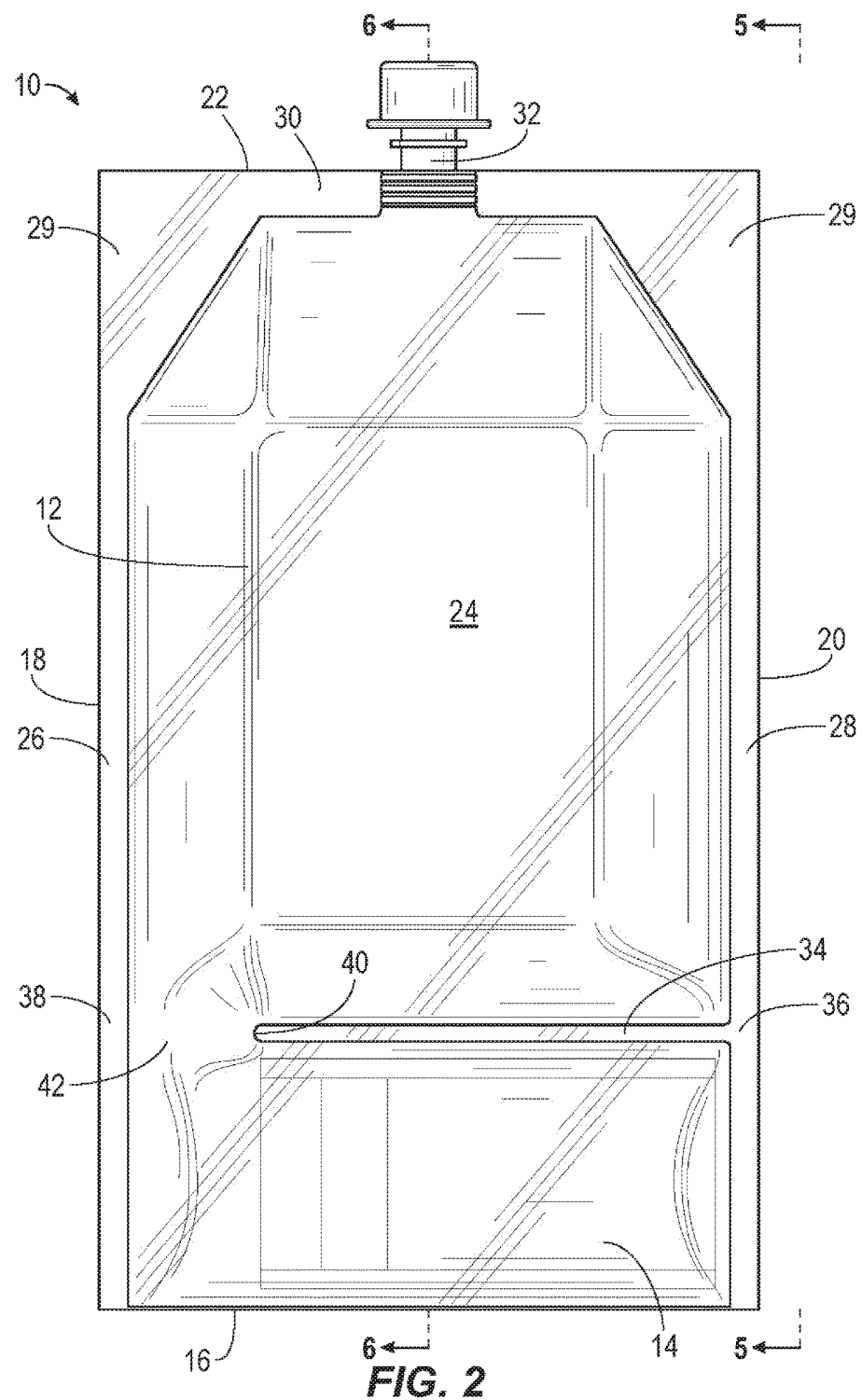
FIG. 2 is top view of the multi-functional, two-pouch package illustrated in FIG. 1.

FIG. 1 is a perspective view of an embodiment of a multi-functional, two-pouch package 10 containing two reactive components. FIG. 2 is a view from above of the package of FIG. 1. FIGS. 1 and 2 illustrate package 10 in a position for filling the primary pouch with the first reactive liquid component. However, during use package 10 is usually inverted so that gravity is used to dispense liquid through fitment 32.

Viewing FIGS. 1 and 2 together, package 10 has primary pouch (i.e., outer pouch) 12 and secondary pouch (i.e., inner pouch) 14. Primary pouch 12 is made from a single piece of film 24 folded in half, with top folded edge 16, first side edge 18, second side edge 20, and bottom edge 22. Primary pouch 12 has a perimeter seal including first side seal 26 along first side edge 18, second side seal 28 along second side edge 20, bottom seal 30 along bottom edge 22, with bottom seal 30 being sealed to a flange portion of dispensing fitment 32. Corners 29 can also be sealed as illustrated, to assist in ensuring that liquid does not hang up in the corners during dispensing.

Primary pouch 12 also has internal seal 34 extending inwardly from a first location 36 along second side seal 28 towards a second location 38 along first side seal 26. Internal seal 34 stops at internal seal end 40, i.e., without reaching location 38 on first side seal 26, thereby leaving liquid flow passageway 42 between first side seal 38 and end 40 of internal seal 34. Internal seal 34 divides primary pouch 12 into first compartment 25 and second compartment 27, with internal seal 34 confining secondary pouch 14 inside second compartment 27.

Figure 3:
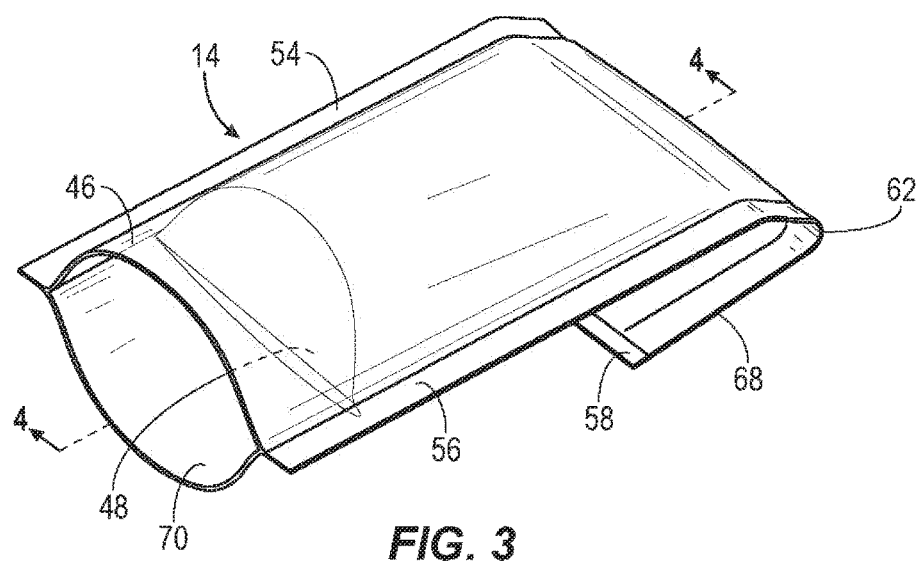
FIG. 3 is a cross-sectional view taken through section 4-4 of FIG. 3.
Figure 4:
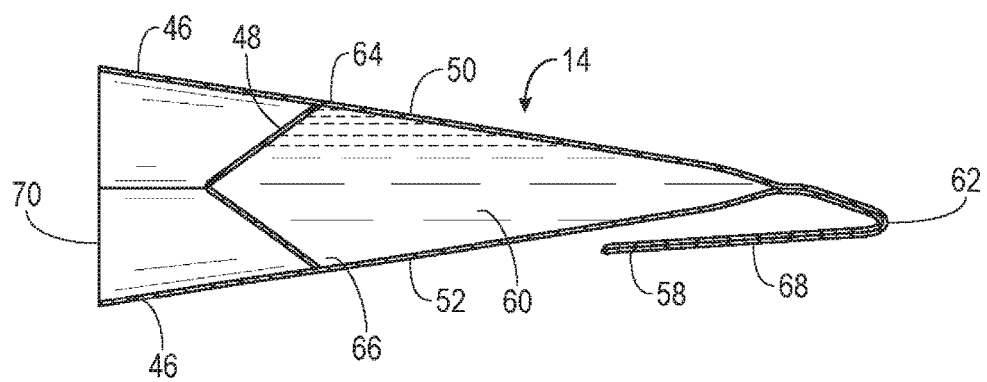
FIG. 4 is a cross-sectional view taken through section 4-4 of the secondary pouch illustrated in FIG. 3.

FIG. 3 is a perspective view of the secondary pouch 14 of the multi-functional, two-pouch package 10 illustrated in FIGS. 1 and 2. FIG. 4 is a longitudinal cross-sectional view of secondary pouch 14 taken through section 4-4 of FIG. 3. Viewing FIGS. 3 and 4 together, secondary pouch 14 comprises secondary pouch film 46 and burst membrane 48. Secondary pouch film 46 is present in the form of upper wall 50 and lower wall 52, which are sealed together at first side seal 54, second side seal 56, and bottom seal 58. One edge of burst membrane 48 is heat sealed to upper wall 50 at heat seal 64. An opposing edge of burst membrane 48 is heat sealed to lower wall 50 at heat seal 66.

Inside secondary pouch 14 is second reactive liquid component 60. FIGS. 2 and 3 illustrate secondary pouch 14 in a folded configuration, with fold 62, as secondary pouch 14 is illustrated inside primary pouch 12 in FIGS. 1 and 2. Excess film 68 making up the collapsed "tail" of secondary pouch 14, which is folded under the remainder of secondary pouch 14 at fold 62, allows pouch 14 to be filled and thereafter sealed closed at bottom seal 58, with seal 58 being made at a distance from second reactive liquid component 60. Sealing the secondary pouch with a tail leaves less chance for liquid contamination in the area of seal 58, and can also be carried out in a manner so as to leave air (not illustrated) inside secondary pouch 14. The presence of air may ease the process of bursting burst membrane 48 during the use of the package. Secondary pouch film 46 provides open end 70 so that upon rupture of burst membrane 48, the second reactive liquid component 60 exits secondary pouch 14 and contacts primary reactive liquid component inside primary pouch 10.

FIG. 5 is perspective side view taken from the right hand side of the package 10 shown as view 5-5 in FIG. 2. This view illustrates first compartment 25 containing the first reactive liquid component, and second compartment 27 containing secondary pouch 14 containing the second reactive liquid component. FIG. 5 also illustrates the manner in which internal seal 34 is a bond of the front panel and back panels of primary pouch film 24 to one another, constricting package 10 in the area of internal seal 34. FIG. 5 also illustrates the manner in which the first reactive liquid component forces the front and back panels of the primary pouch apart to provide fluid flow passageway 42 between first compartment 25 and second compartment 27.

FIG. 6 is a longitudinal cross-sectional view of package 10 taken through section 6-6 as shown in FIGS. 1 and 2. FIG. 6 illustrates first compartment 25 within primary pouch 12 and second compartment 27 also within primary pouch 12. Secondary pouch 14 containing second reactive liquid component 60 is inside second compartment 27, retained between top fold 16 and internal seal 34. First compartment 25 of primary pouch 12 contains first reactive liquid component 72.

Figure 7:
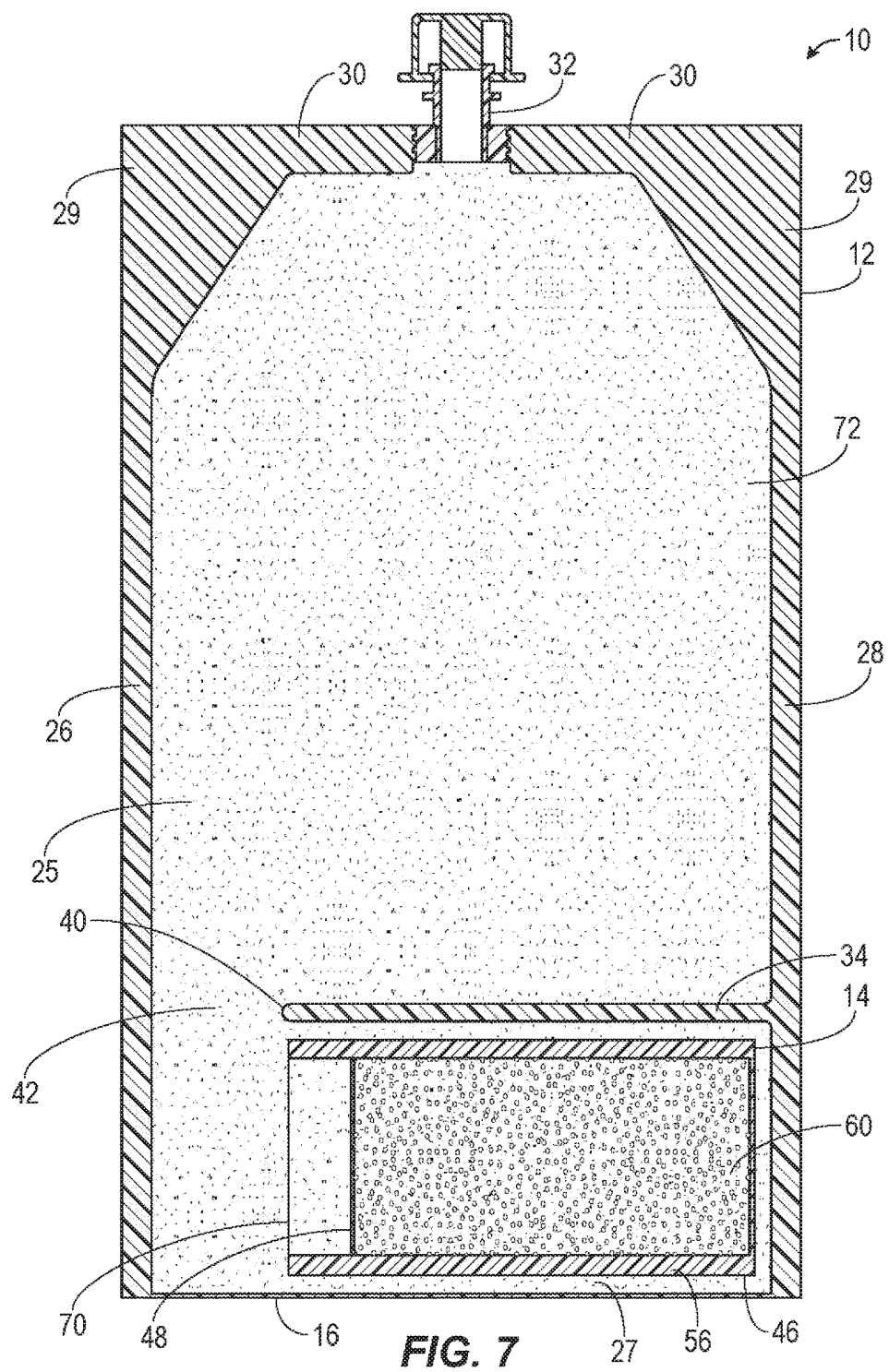
FIG. 7 is a cross-sectional view of the multi-functional, two-pouch package containing two reactive components as illustrated in FIG. 5, taken through section 7-7 of FIG. 5.

FIG. 7 is a longitudinal cross-sectional view of package 10 taken through section 7-7 of FIG. 5. FIG. 7 illustrates package 10 in a storage/shipping mode, with the first and second liquid reactive components separated from one another. FIG. 7 illustrates primary pouch 12 having first compartment 25 and second compartment 27 separated by internal seal 34, with secondary pouch 14 inside second compartment 27. First reactive liquid 72 is present inside primary pouch 12, and is present in both first compartment 25 and second compartment 27. Secondary pouch 14 is made from secondary pouch film 46 sealed to burst membrane 48. Secondary pouch 14 contains second reactive liquid component 60.

Figure 8:
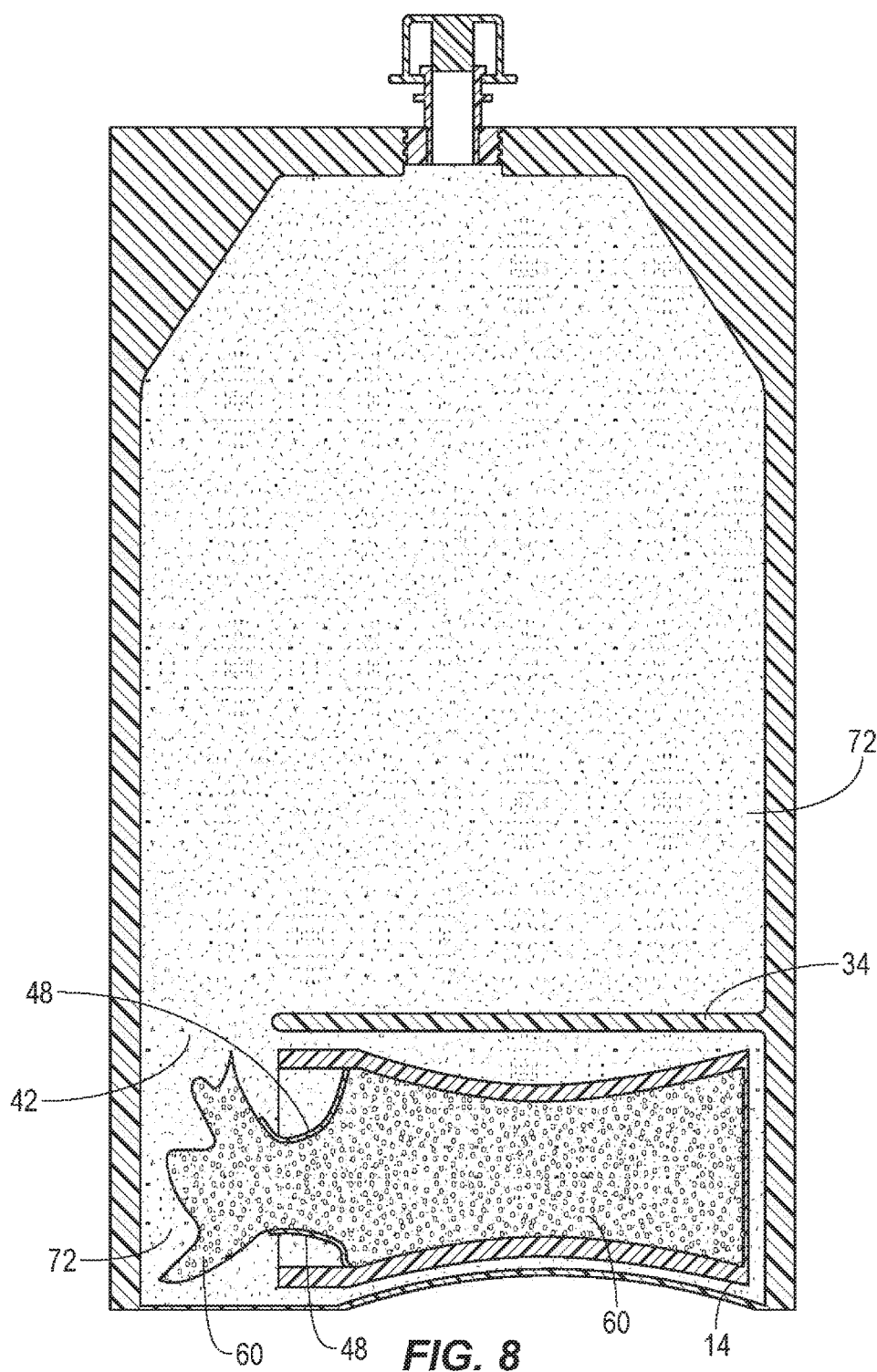
FIG. 8 is a schematic of the cross-sectional view of FIG. 7, immediately after bursting the secondary pouch.

FIG. 8 illustrates the same longitudinal cross-sectional view illustrated in FIG. 7, but FIG. 8 is a schematic rendition after secondary pouch 14 has just been opened by the fracture of burst membrane 48 upon the application to pouch 14 of sufficient pressure to cause burst membrane 48 to rupture. Upon bursting, second liquid reactive component 60 exits secondary pouch 14, contacting first liquid reactive liquid component 72, with the two liquid reactive components beginning to mix with each other.

Figure 9:
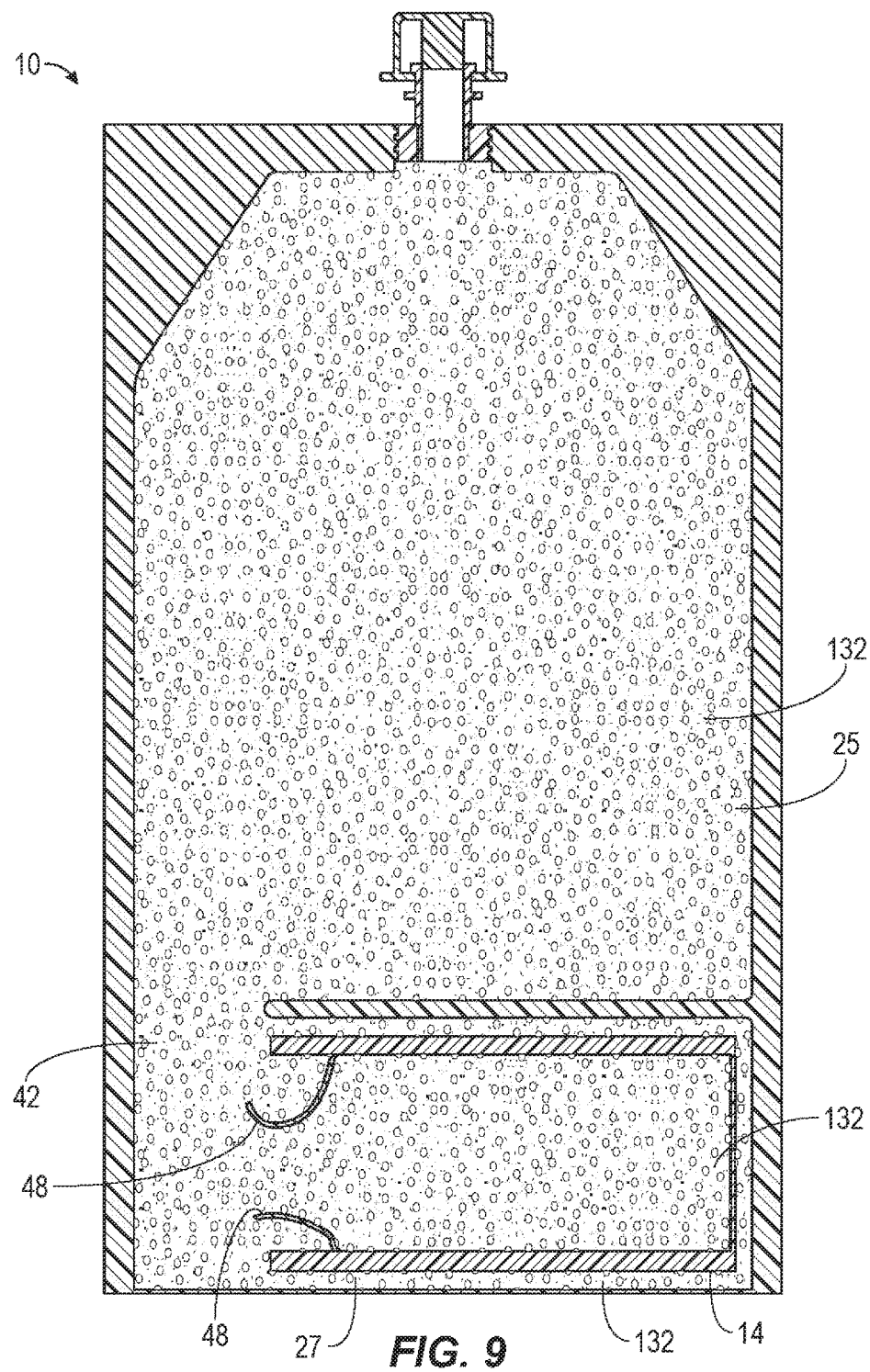
FIG. 9 is schematic of the cross-sectional view of FIGS. 7 and 8, after mixing the first and second reactive components of the primary pouch with the contents of the secondary pouch.

FIG. 9 illustrates package 10 after mixing is complete, with the fracture of burst membrane 48 plus manipulation of package 10 to causing first and second liquid reactive components 60 and 72 (see FIG. 8) to combined and intermix with one another to form uniform liquid mixture 132 as illustrated in FIG. 9, which after mixing is throughout first compartment 25 and second compartment 27, and which is also present inside burst secondary pouch 14. At this stage, package 10 is in condition to be inverted so that liquid mixture 132 can be dispensed.

It has been found that if a relatively stiff film is used to make the primary pouch, it is advantageous to provide air inside the pouch when the package is formed. The air can be inside the primary pouch and/or the secondary pouch. The presence of the air allows the liquid mixture to drain from the package to substantial completion, under the action of gravity. It has been discovered that in the absence of air within the package, the liquid mixture does not drain to substantial completion. In a package having a total liquid volume of 1.5 liters, as much as 100 milliliters of liquid mixture may remain inside the package if dispensing is carried out under the action of gravity without manipulation of the package to effect complete dispensing of the mixture.

As used herein, the phrase "internal length," as applied to a pouch, refers to the length of the internal region of the pouch i.e., the distance of the unsealed region between the top and bottom edges of the pouch. The internal length is measured with the pouch empty in a flattened position. For a lay-flat pouch, the internal length is measured with the pouch empty and in its lay-flat configuration.

As used herein, the phrase "first location" refers to a point along the perimeter of the package that the internal seal extends from. As used herein, the phrase "second location" refers to a point along the perimeter of the package that the internal seal extends toward but does not reach, as the gap between the terminal internal end of the internal seal and he second location defines the fluid flow passageway.

The internal seal can run from any first location on the perimeter of the primary pouch to any second location along the perimeter, so long as a straight line connecting the first location to the second location, together with the shortest portion of the perimeter connecting the first and second location, define a portion (of the primary pouch) sized for containment of the secondary pouch. The internal seal can run parallel to the top and bottom edges of a rectangular primary pouch, as illustrated in FIGS. 1-9, or it can run along parallel to the side edges of a rectangular or square primary pouch, or it can run at any desired angle relative to the perimeter edges of the primary pouch.

If the internal seal reaches the second location, there is no fluid flow passageway, which is required for the mixing of two component systems in which the internal seal does not itself fracture to allow mixing to occur. The length of the internal seal should be such that the liquid flow passageway has a width of from 15% to 45% of the distance between the first location and the second location.

However, the internal seal need not extend all the way to the first location. The internal seal can extend from the first location toward the second location, but be spaced a short distance from the first location. A gap between the first location and the beginning of the internal seal can be, for example, 10 millimeters or less. Such a small gap does not serve as an adequate fluid flow passageway for the mixing of the first liquid reactive component with the second liquid reactive component, so that the fluid flow passageway must be made by terminating the internal end of the internal seal a distance of at least 11 millimeters from the second location.

The width of the fluid flow passageway should not be so large that the secondary pouch can slip out of the second compartment and into the first compartment. If this occurs the secondary pouch may be more difficult to open because it can move around inside the first compartment and is not in a relatively immobile position as pressure is applied to cause it to open. As a result, it is advantageous if the width of the fluid flow passageway is up to, but no wider than, 75% of the length of the secondary pouch, as a width of 80% or more may allow the secondary pouch to shift out of the second compartment during moving, storage, making it more difficult to apply pressure to cause the secondary pouch to open, etc. In an embodiment, the width of the fluid flow passageway is from 5 to 60% of the length of the secondary pouch, or from 100 to 50% of the length of the secondary pouch, or from 20 to 40 percent of the length of the secondary pouch.

The primary pouch may contain a first liquid reactive component which may be, for example, a crosslinkable polyurethane and/or a crosslinkable polyurea, and the second reactive liquid component may comprise at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide. The second liquid reactive component is selected to function as a crosslinker for reaction with the first liquid reactive component.

Alternatively, the first reactive liquid component may be a polyol and the second reactive liquid component may be a polyisocyanate material. The polyol may include at least one member selected from the group consisting of linear polyol, branched polyol, cyclic polyalkyl polyol, polyalkene polyol, polyalkenyl polyol, polyether polyol, fluoropolymer polyol, polyester polyols poly(acrylate)polyol, poly(methacrylate)polyol, polysiloxane polyol, polycarbonate polyol and polyurethane polyol. The first reactive liquid component may comprise the polyol in an amount of from 15 wt % to 90 wt % polyol, based on total weight of the first reactive liquid component.

The polyisocyanate material of the second component may include at least one member selected from the group consisting of aromatic polyisocyanate and aliphatic polyisocyanate. More particularly, the polyisocyanate material may include hydrophilically modified trimer of hexamethylene diisocyanate, hydrophilically modified trimer of isophorone diisocyanate, aromatic diisocyanate, aliphatic diisocyanate. The polyisocyanate may be present in the second component in an amount of, i.e., a percent solids level, of from about 25 wt % and 75 wt % polyol, based on total weight of the second reactive liquid component, or from about 30 wt % to about 60 wt % polyol, based on total weight of the second reactive liquid component.

The primary pouch film may be made from any suitable film. In an embodiment, the primary pouch film is heat sealable to itself or another film. As used herein, the term "heat-seal," and the phrase "heat-sealing," refer to any seal of a first discrete region of a film surface to a second discrete region of a film surface, wherein the heat seal is formed by heating the discrete regions to at least their respective seal initiation temperatures.

Suitable polymers for use in heat seal layers include polyolefin, including at least one member selected from the group consisting of polymerized $C_{2-10}$ olefins (particularly ethylene/alpha-olefin copolymers, homogeneous ethylene/alpha-olefin copolymer), polyamide, polyester, polycarbonate, and ionomer resin. The primary pouch may be provided with a high strength layer, such as a layer of polyamide, polycarbonate, ultra high molecular weight polyethylene, etc. Oriented film layers, such as biaxially oriented polyamide, can be used to provide the primary pouch with high strength.

In one embodiment the primary pouch film comprises ethylene/α-olefin copolymer and at least one member selected from the group consisting of polyamide and polyester. In an embodiment the primary pouch film has a thickness of from 6 to 12 mils and is a multilayer film consisting of a first layer having a thickness of from 0.5 to 1.3 mils and containing biaxially oriented polyamide, and a second layer having a thickness of from 4 to 11 mils and consisting of linear low density polyethylene.

In addition to the embodiments illustrated in FIGS. 1-9, described above, the primary pouch (as well as the secondary pouch) can be made from a wide variety of different fillable packaging, such as end-seal bag, side seal bag, backseamed bag (lap sealed or with butt sealed with backseam tape), L-seal bag, U-seal bag, etc., as known to those of skill in the art, and as disclosed in U.S. Pat. Nos. 6,790,468 and 7,687,123, each of which is hereby incorporated, in its entirety, by reference thereto.

In an embodiment, the secondary pouch is oriented in the second compartment such that its open end (i.e., the end from which its contents will emerge upon opening in its designed manner) is towards the fluid flow passageway, rather than oriented away from the fluid flow passageway. This orientation is as illustrated in FIGS. 1-9. This orientation eases the mixing process by allowing the contents of the secondary pouch the easiest route towards mixing with the first liquid reactive component in the first compartment.

The secondary pouch may be made from one or more films. The secondary pouch is burstable, in that pressure can be applied to cause the secondary pouch to open while it remains sealed inside the closed primary pouch. The bursting of the secondary pouch can be effected by making all or a portion of the secondary pouch from a burstable membrane, and/or providing the secondary pouch with at least one frangible seal.

In an embodiment, the secondary pouch is made from a film including a polyolefin and at least one member selected from the group consisting of polyamide, polyester, polycarbonate, and ionomer resin. In another embodiment, the secondary pouch film may comprise ethylene/α-olefin copolymer and at least one member selected from the group consisting of polyamide and polyester.

The film(s) from which the secondary pouch is made may have a thickness of from 1 to 15 mils, or from 1 to 10 mils, or from 1.2 to 5 mils, or from 1.5 to 4 mils, or from 2 to 4 mils, or from 2.5 to 3.5 mils. In an embodiment, the film is a multilayer film made from a first layer containing polyethylene terephthalate, the first layer having a thickness of from 0.5 to 1.5 mils, and a second layer made from linear low density polyethylene, the second layer having a thickness of from 1.5 to 4.5 mils.

The burst membrane is designed to allow the secondary pouch to burst with minimal effort, while at the same time resisting bursting during transport and storage, i.e., until the time the product is to be used. The burst membrane may be made from polyolefin, particularly polyethylene. For example, the burst membrane may consist of polyethylene, and may have a thickness of from 1 to 5 mils, or 1 to 3 mils, or 1.2-3 mils, or 1.5-2.5 mils or from 1.8-2.2 mils.

If any of the reactive components are adversely affected by water vapor, e.g., such as polyisocyanate materials, the film of any pouch in direct contact with such reactive component can be made from one or more materials which render it substantially impermeable to water vapor. The film can be made with a water vapor transfer rate as low as 0.0010 or less grams of water per day per 100 in$^2$ @ 100° F. and 100% relative humidity. Providing the film with a layer of metal foil or one or more metallized layer can render the film substantially impermeable to water vapor. Other potentially suitable film layers include ACLAR® fluorocarbon films available from Allied-Signal, Inc. of Morristown, N.J. Higher water vapor transfer rates are acceptable where shorter shelf life is acceptable, and materials with lower transfer rates can be incorporated where longer shelf life is desired or necessary. A 50 micron (i.e., approximately 2 mil) film made from high density polyethylene has a moisture vapor transmission rate of 0.8 g/m$^2$/day at 85% relative humidity.

If the secondary pouch contains polyisocyanate material, and a metal film is provided to prevent the polyisocyanate from being exposed to water vapor until use occurs, the secondary pouch may be made from a film which does not possess low burst strength. However, such a film may nevertheless be used if it is provided with a frangible seal so that the seal fails upon application of the requisite pressure to the frangible seal. A frangible seal may be formed using a film seal layer containing a heat sealable polymer resin for which the strength of the heat seal is a function of the heat sealing temperature applied to the resin. Appropriate resins can include ionomers; i.e. copolymers of ethylene and vinyl monomers with an acid group, such as methacrylic acid, such as SURLYN® ionomer resins from Du Pont. Frangible seals utilizing ionomer resin are described in U.S. Pat. No. 6,272,813, to Sperry et al, which is hereby incorporated, in its entirety, by reference thereto.

Seal temperatures required to form the frangible seals are generally much lower than those required to create the hermetic edge seals. Frangible seals can be made in accordance with U.S. Pat. No. 5,996,782, which is hereby incorporated, in its entirety, by reference thereto. Frangible seals may also be formed over a pattern of printed release agent in which said agent prevents the printed portion of the plastic material from heat sealing, so that the amount of printed portions in said pattern determines the seal strength. The frangible seal may be adapted for manual rupturing.

Working Example and Comparative Example

It has been found that a working embodiment of package 10 as illustrated in FIGS. 1-9 had a primary pouch film which exhibited surprisingly more resistance to failure in drop testing than the primary pouch film of a comparative embodiment. It has been surprisingly found that the difference was due to the size and placement of the liquid flow passageway. It has been discovered that substantially improved drop test results can be obtained by providing the liquid flow passageway along or close to one of the perimeter edges of the package, as opposed to in a central region of the package.

The following is a brief description of a working embodiment and a comparative embodiment, including a description of the differences in the drop test results obtained with each embodiment. It is believed that the difference in the drop test results is due to the difference in the placement of the liquid flow passageway.

The working embodiment and the comparative embodiment were the same with respect to: (i) the primary pouch film total thickness, number of layers, layer composition, and layer arrangement (ii) the primary pouch lay-flat length and width before filling with liquid (iii) the manner in which the perimeter seals were made (iv) the composition and amount of the first liquid reactive component (v) the composition and amount of the second liquid reactive component (vi) the lay-flat area of the first compartment before the addition of liquid (vii) the lay-flat area of the second compartment before the addition of liquid, and (viii) the width of the fluid flow passageway between the first and second compartments.

However, the working embodiment differed from the comparative embodiment in that the working embodiment contained in the second compartment a separate secondary pouch having a burst membrane. In contrast, the comparative embodiment had in the second compartment a burst membrane heat sealed to the inside of the primary pouch, with the second liquid reactive component surrounded by and contacting both the inside surface of the primary pouch and the burst membrane, rather than providing the comparative embodiment with a secondary pouch as in the working embodiment. However, as the drop test resulted in failure of the primary pouch, and not the secondary pouch of the working embodiment or the burst membrane of the comparative embodiment, the difference between having a separate secondary pouch in the second compartment (working embodiment) versus a burst membrane sealed to the inside of the primary pouch to confine the second component (comparative embodiment) was deemed unrelated the difference in burst test results.

The working embodiment and the comparative embodiment differed in the configuration of the internal seal and the location of the fluid flow passageway. The working embodiment had an internal seal as illustrated in FIGS. 1-9, described above.

More particularly, in the working embodiment, the internal seal connected with only one of the side seals, i.e., as illustrated in FIGS. 1-9, but did not connect with the second side seal. In the working embodiment, the internal seal extended inwardly, in a direction perpendicular to the second side seal, from a first location on second side seal 28, directly across the primary pouch for a distance of about 80% of the internal width of the pouch in the direction of the seal. The inward terminal end of the internal seal left a 40 millimeter wide unsealed gap between the internal end of the internal seal and a second location, the second location being the location which the internal seal would have met if extended further in the same direction all the way across the internal width of the primary pouch. However, as the internal seal stopped 40 millimeters short of the second location, the resulting 40 millimeter wide gap became the liquid flow passageway, i.e., the same basic configuration as liquid flow passageway 42 illustrated in FIGS. 1-9.

In the working embodiment, the 40 millimeter wide gap was approximately 20% of the 195 millimeter internal width of the primary pouch. The liquid flow passageway had a width of 40 millimeters, i.e., a width of 20% of the distance between the first location (i.e., the location along second side seal 28 from which internal seal 34 extended) and the second location, i.e., the location along first side seal 26 that internal seal 34 would have intersected if it continued to extend in the same direction all the way to the second location. Moreover, in the working embodiment the distance between the second location and the width centerpoint of the fluid flow passageway was only 10% of the distance between the first location and the second location.

In contrast, the comparative embodiment also had an internal seal which extended across the width of the primary pouch and also left a liquid flow passageway having a width of 40 millimeters, i.e., a width which was 20% of the distance between the first location and the second location. However, unlike the working embodiment, in the comparative embodiment the internal seal was made as two separate parts. The first part extended inwardly from the first location in exactly the same manner as the internal seal in the working embodiment. However, the first part extended only 40% of the distance across the internal width of the primary pouch (vs. 80% for the working embodiment). The second part of the internal seal in the comparative embodiment extended inwardly perpendicular to the first side seal and from the same second location on the first side seal, and it also extended 40% of the distance across the internal width of the primary pouch.

As with the working embodiment, the resulting comparative embodiment had the same 40 millimeter wide gap as the width of the liquid flow passageway. However, unlike the working embodiment, in the comparative embodiment the gap was centered in the center of the width of the package. Thus, the comparative embodiment had a fluid flow passageway with a width of 20% of the distance between the first location and the second location, but the fluid flow passageway in the comparative embodiment had a width centerpoint located a distance from the second location which was 50% of the distance between the first location and the second location, i.e., the maximum possible percentage. In contrast, the working embodiment had a fluid flow passageway with a width centerpoint which located so close to the second location that the distance was only 10% of the distance between the first location and the second location.

Drop testing was conducted using a L.A.B. ACCUDROP® Model AD-160-72 drop tester. Twenty packages of each of the working embodiment and the comparative embodiment were dropped from 36 inches onto a metal plate over concrete, using the drop tester. The packages were dropped so that they landed flat on one of their principal side surfaces. Of the twenty working embodiment packages dropped from 36 inches, no package leaked. Of the twenty comparative embodiment packages dropped from 36 inches, six packages leaked. Thus, the failure rate for a 36 inch drop for the working embodiment was 0%, but for the comparative embodiment was 30%.

This result was surprising because the first package design was the comparative embodiment, i.e., it was not realized that having the fluid flow passageway in the middle of the package impaired the drop test survivability of the package. Moreover, it was not realized that moving the fluid flow passageway to one of the side edges allowed the package to be dropped from 36 inches with 100% survivability in the twenty working embodiment examples tested.

In the drawings and specification, there have been disclosed typical preferred embodiments of the invention and, although specific terms have been employed, they have been used in a generic and descriptive sense only and not for purpose of limitation, the scope of the invention being set forth in the following claims.

What is claimed is:

1. A two-component reactive floor coating composition in a multi-functional package for complete and separated containment of a first reactive liquid component and a second reactive liquid component during storage and shipment, and for complete and unseparated containment of the first and second reactive liquid components during contact and intermixture with one another, and for controlled containment and controlled dispensing of the reactive liquid components after their contact and intermixture with one another, the two-component reactive floor coating composition in the multi-functional package comprising:
   (A) wherein the first reactive liquid component is sealed inside a closed primary pouch comprising a primary pouch film, with the first reactive liquid component being in direct contact with an inside surface of the primary pouch;
   (B) wherein the second reactive liquid component is inside a closed secondary pouch comprising a secondary pouch film, the second pouch being a burstable pouch, the secondary pouch being sealed inside the primary pouch, the secondary pouch comprising the second reactive liquid component in direct contact with an inside surface of the secondary pouch, with an outside surface of the secondary pouch being in direct contact with the first reactive liquid component;
   (C) a fitment attached to the primary pouch for the controlled dispensing of the first reactive liquid component and the second reactive liquid component after the first reactive liquid component and the second reactive liquid component have been combined and intermixed inside the primary pouch; and
   wherein the primary pouch has at least one external seal of a peripheral section of the primary pouch film along a perimeter edge portion of the primary pouch, and at least one internal seal of the primary pouch film at an interior portion of the primary pouch, the internal seal dividing the primary pouch into a first compartment and a second compartment with the first and second compartments being connected to one another with a liquid flow passageway, with the second compartment being sized for confinement of the secondary pouch during storage, transport, and application of pressure to burst the secondary pouch, with the internal seal extending from a first location on the peripheral edge portion of the primary pouch toward a second location on the peripheral edge portion of the primary pouch, the internal seal extending across 55% to 85% of an internal distance between the first location and the second location, the internal seal terminating with an internal end before reaching the second location, with the liquid flow passageway being between the internal end of the internal seal and the second location, wherein the width of the liquid flow passageway is at least partially based on the amount of extension of the internal seal between the first location and the second location and is:
   (a) up to 75% of the length of the secondary pouch, and
   (b) 15 to 45% of the internal distance between the first location and the second location, with the liquid flow passageway having a centerpoint in a position within 7.5% to 22.5% of the second location, based on the internal distance between the first location and the second location.

2. The two-component reactive floor coating composition in the multi-functional package according to claim 1, wherein the first and second components comprise one member selected from the group consisting of:
   (A) the first reactive liquid component comprises an aqueous emulsion comprising at least one member selected from the group consisting of a crosslinkable polyurethane and a crosslinkable polyurea, and the second reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide;
   (B) the first reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide and the second reactive liquid component comprises an aqueous emulsion of at least one member selected from the group consisting of crosslinkable polyurethane and crosslinkable polyurea;
   (C) the first reactive liquid component comprises an aqueous dispersion of at least one member selected from the group consisting of polyol, polyamine, and polyhydrazide, and the second reactive liquid component comprises a polyisocyanate and an organic solvent, such that when combined the first and second components have no more than 1 wt % organic solvent having a vapor pressure of greater than 0.1 mm Hg at 20° C.; and
   (D) the first reactive liquid component comprises a polyisocyanate material and an organic solvent, and the second reactive liquid component comprises an aqueous dispersion of at least one member selected from the group consisting of polyol, polyamine, and polyhydrazide, such that when combined the first and second components have no more than 1 wt % organic solvent having a vapor pressure of greater than 0.1 mm Hg at 20° C.

3. The two-component reactive floor coating composition in the multi-functional package according to claim 2, wherein the secondary pouch further comprises a burst membrane which is different from the secondary pouch film, wherein the rupture stress of the burst membrane is less than the rupture stress of the secondary pouch film.

4. The two-component reactive floor coating composition in the multi-functional package according to claim 3, wherein the secondary pouch film and the burst membrane are both substantially impermeable to water vapor.

5. The two-component reactive floor coating composition in the multi-functional package according to claim 2, wherein the secondary pouch comprises a frangible seal having a failure stress less than the rupture stress of the secondary pouch film.

6. The two-component reactive floor coating composition in the multi-functional package according to claim 5, wherein the secondary pouch film is substantially impermeable to water vapor.

7. The two-component reactive floor coating composition in the multi-functional package according to claim 2, wherein:
the first reactive liquid component comprises an aqueous emulsion of a crosslinkable polyurethane, the second reactive liquid component comprises a carbodiimide crosslinker, and
the secondary pouch further comprises a burst membrane which is different from the secondary pouch film, and the rupture stress of the burst membrane is less than the rupture stress of the secondary pouch film.

8. The two-component reactive floor coating composition in the multi-functional package according to claim 7, wherein:
the first reactive liquid component is present in an amount of 1.2 to 2 liters and the second reactive liquid component is present in an amount of 0.084 to 0.140 liters and the primary pouch film comprises ethylene/α-olefin copolymer and polyamide and has a thickness of 8 to 10 mils,
the secondary pouch film comprises ethylene/α-olefin copolymer and polyester and has a thickness of 3.3 to 3.7 mils,
the internal seal extends across 78% to 82% of the internal distance between the first location and the second location, and the liquid flow passageway width is from 18% to 22% of the internal distance between the first and second locations, and the centerpoint of the liquid flow passageway is in a position located 9% to 13% of the internal distance from the second location based on the internal distance between the first location and the second location and the liquid flow passageway width; and
the package comprises from 70 to 300 cubic centimeters of air.

9. The two-component reactive floor coating composition in the multi-functional package according to claim 8, wherein the dispensing fitment comprises a valve.

10. The two-component reactive floor coating composition in the multi-functional package according to claim 2, wherein:
the first reactive liquid component comprises an aqueous emulsion of at least one polyol material and at least one wax, and the second reactive liquid component comprises a polyisocyanate material and at least one organic solvent, and when combined the first and second reactive liquid components have no more than 1 wt % organic solvent having a vapor pressure of greater than 0.1 mm Hg at 20° C., and
the secondary pouch comprises a frangible seal having a failure stress less than the rupture stress of the secondary pouch film and the secondary pouch film is substantially impermeable to water vapor.

11. The two-component reactive floor coating composition in the multi-functional package according to claim 10, wherein:
the first reactive liquid component is present in an amount of 1.2 to 2 liters and the second reactive liquid component is present in an amount of 0.084 to 0.140 liters and the primary pouch film comprises ethylene/α-olefin copolymer and polyamide and has a thickness of 8 to 10 mils,
the secondary pouch film comprises ethylene/α-olefin copolymer, polyester, and a vapor barrier layer, and the secondary pouch has a thickness of 3.3 to 3.7 mils,
the internal seal extends across 78% to 82% of the internal distance between the first location and the second location, and the width of the liquid flow passageway is from 18% to 22% of the internal distance between the first and second locations, and the centerpoint of the liquid flow passageway is in a position located 9% to 13% of the internal distance from the second location based on the internal distance between the first location and the second location and the liquid flow passageway width; and
the package comprises from 70 to 300 cubic centimeters of air.

12. The two-component reactive floor coating composition in the multi-functional package according to claim 11, wherein the dispensing fitment comprises a valve.

13. The two-component reactive floor coating composition in the multi-functional package according to claim 1, wherein the first reactive liquid component is present in an amount of 1 to 5 liters and the second reactive liquid component is present in an amount of 0.07 to 0.35 liters and the primary pouch film comprises ethylene/α-olefin copolymer and polyamide and has a thickness of 6 to 20 mils, and the secondary pouch film comprises ethylene/α-olefin copolymer and polyester and has a thickness of 2 to 5 mils, and the internal seal extends across 70% to 85% of the internal distance between the first location and the second location, and the liquid flow passageway width is from 15 to 30% of the internal distance between the first and second locations, and the centerpoint of the liquid flow passageway is in a position located 7.5% to 22.5% of the internal distance from the second location based on the internal distance between the first location and the second location and the liquid flow passageway width.

14. The two-component reactive floor coating composition in the multi-functional package according to claim 13, wherein the package comprises from 50 to 500 cubic centimeters of air.

15. The two-component reactive floor coating composition in the multi-functional package according to claim 1, wherein the first reactive liquid component is present in an amount of 1.2 to 4 liters and the second reactive liquid component is present in an amount of 0.084 to 0.28 liters and the primary pouch film comprises ethylene/α-olefin copolymer and polyamide and has a thickness of 7 to 15 mils, and the secondary pouch film comprises ethylene/α-olefin copolymer and polyester and has a thickness of 3 to 4 mils, and the internal seal extends across 75% to 83% of the internal distance between the first location and the second location, and the liquid flow passageway width is from 17% to 25% of the internal distance between the first and second locations, and the centerpoint of the liquid flow passageway is in a position located 8.5% to 16.5% of the internal distance from the second location based on the internal distance between the first location and the second location and the liquid flow passageway width.

16. The two-component reactive floor coating composition in the multi-functional package according to claim 15, wherein the package comprises from 60 to 400 cubic centimeters of air.

17. The two-component reactive floor coating composition in the multi-functional package according to claim 1, wherein the first reactive liquid component is present in an amount of 1.2 to 2 liters and the second reactive liquid component is present in an amount of 0.084 to 0.140 liters and the primary pouch film comprises ethylene/α-olefin copolymer and polyamide and has a thickness of 8 to 10 mils, and the secondary pouch film comprises ethylene/α-olefin copolymer and polyester and has a thickness of 3.3 to 3.7 mils, and the internal seal extends across 78% to 82% of the internal distance between the first location and the second location, and the liquid flow passageway width is from 18% to 22% of the internal distance between the first and second locations, and the centerpoint of the liquid flow passageway is in a position located 9% to 13% of the internal distance from the second location based on the internal distance between the first location and the second location and the liquid flow passageway width.

18. The two-component reactive floor coating composition in the multi-functional package according to claim 17, wherein the package comprises 70 to 300 cubic centimeters of air.

* * * * *